United States Patent [19]

Brenner et al.

[11] Patent Number: 5,386,973

[45] Date of Patent: Feb. 7, 1995

[54] ELASTOMERIC BEARING

[75] Inventors: Heinrich Brenner, Ahrweiler; Heinrich Meyer, Königswinter, both of Germany

[73] Assignee: BOGE AG, Eitorf, Germany

[21] Appl. No.: 62,284

[22] Filed: May 17, 1993

[30] Foreign Application Priority Data

May 15, 1992 [DE] Germany .......................... 4216185

[51] Int. Cl.6 ................................. F16F 9/10
[52] U.S. Cl. ................ 267/140.13; 267/140.5
[58] Field of Search .......... 267/140.5, 140.11–140.15, 267/141, 141.2, 141.3, 219, 152; 248/562, 636

[56] References Cited

U.S. PATENT DOCUMENTS

| 4,262,886 | 4/1981 | Le Salver et al. ............... 267/8 R |
| 4,378,936 | 4/1983 | Brenner ....................... 267/140.1 |
| 4,607,828 | 8/1986 | Bodin et al. ................ 267/140.13 |
| 4,676,489 | 6/1987 | Hofmann et al. ............ 267/140.13 |
| 4,739,962 | 4/1988 | Morita et al. ................... 248/562 |
| 4,741,519 | 5/1988 | Dubos et al. ................. 267/140.1 |
| 4,757,982 | 7/1988 | Andra et al. .............. 267/140.5 X |
| 4,781,362 | 11/1988 | Reuter et al. ................... 267/219 |
| 4,783,063 | 11/1988 | Probst et al. ............... 267/140.13 |
| 4,905,955 | 3/1990 | Brizzolesi et al. ........ 267/140.13 X |
| 4,921,049 | 5/1990 | Kaiser et al. .............. 267/140.13 |
| 4,921,232 | 5/1990 | Hofmann .................. 267/140.13 X |
| 4,955,589 | 9/1990 | West ............................ 267/140.1 |
| 4,997,168 | 3/1991 | Kato ......................... 267/140.13 |
| 5,005,810 | 4/1991 | Sawada et al. ............. 267/140.13 |
| 5,078,369 | 1/1992 | Pascal et al. ............... 267/140.11 |
| 5,246,211 | 9/1993 | Klein et al. ................ 267/140.13 |

FOREIGN PATENT DOCUMENTS

| 0042761 | 12/1985 | European Pat. Off. . |
| 500432 | 8/1992 | European Pat. Off. ........ 267/140.13 |
| 2605693 | 4/1988 | France . |
| 3024090 | 10/1981 | Germany . |
| 3521246 | 1/1987 | Germany . |
| 55-149436 | 11/1980 | Japan . |
| 59-37349 | 2/1984 | Japan . |
| 4012153 | 1/1989 | Japan .............. 267/140.13 |
| 1193425 | 8/1989 | Japan .............. 267/140.13 |

*Primary Examiner*—Robert J. Oberleitner
*Assistant Examiner*—Alfred Muratori
*Attorney, Agent, or Firm*—Nils H. Ljungman & Associates

[57] ABSTRACT

An elastomeric bearing, such as a hydraulically damping bearing for motor vehicles can have at least two fastening parts which are connected to one another by means of an elastomer spring. Such a bearing can also have a vertically acting hydraulic damping apparatus and at least one hydraulic damping apparatus acting in the horizontal direction, which damping apparatus essentially are chambers filled with damping fluid and connected to one another by damping passages. The chambers of the horizontally acting damping apparatus can be molded into the elastomer spring and disposed opposite to one another in the direction of damping, with at least one passage connecting the chambers. The chambers of the horizontally acting damping apparatus can be bordered by a separating part, and underneath the separating part there can be a second damping apparatus oriented in the direction of the Cz vertical coordinate axis. The chambers of the second damping apparatus can be located one above the other in the direction of the Cz coordinate axis and can be connected to one another by an additional connecting passage.

5 Claims, 7 Drawing Sheets

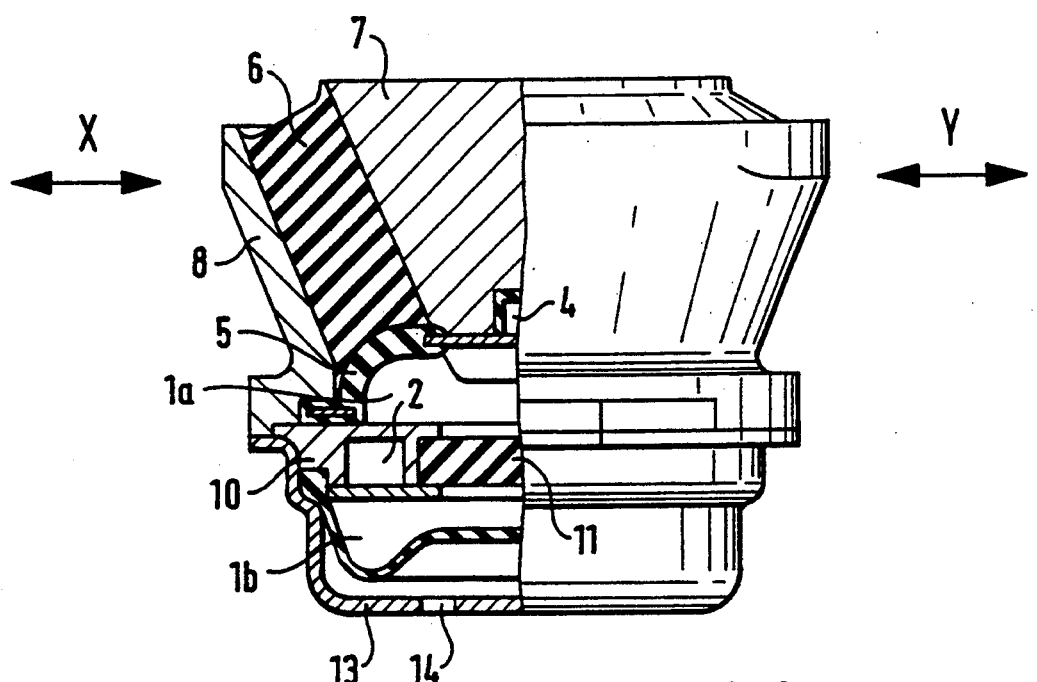
FIG. 3
FIG. 4
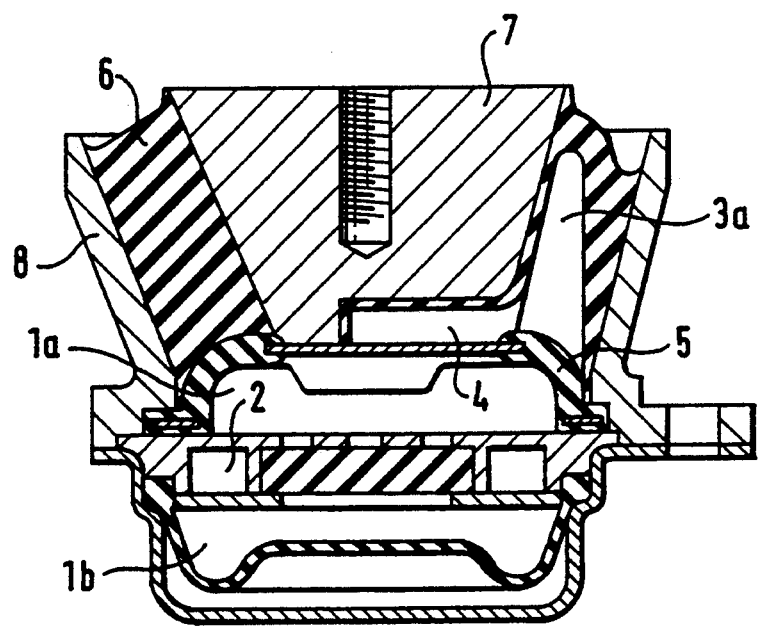

ELASTOMERIC BEARING

BACKGROUND OF THE INVENTION

1. Field of the Invention

This invention relates to an elastomeric bearing, and more particularly to an elastomeric bearing for use in motor vehicles. Such bearings typically have at least two fastening parts which can be connected to one another by means of an elastomer spring. In addition, there can also be a vertically acting hydraulic damping apparatus and at least one hydraulic damping apparatus acting in at least one horizontal direction. The damping apparatus, in general, will comprise chambers filled with damping fluid, while the chambers can be connected to one another by means of damping passages.

2. Background Information

Known elastomeric bearings typically have, as discussed above, two fastening parts which are connected to one another by means of an elastomer spring, and also include a hydraulic damping apparatus. In the elastomeric bearing as disclosed by German Patent No. 30 24 090, the elastomer spring is divided by the fluid chambers into an outer, one-piece, or multi-piece thrust spring, and an inner, ring-shaped elastomeric spring. The inner spring will generally be in contact with the fastening part by means of a base body. As a result of this configuration, only a small proportion of the bearing load is absorbed by the inner ring-shaped elastomeric spring, and a damping of the low-frequency vibrations in the vertical direction is achieved. One disadvantage of a bearing of this type is that no damping can take place in the soft thrust direction. Thus, on account of the soft small spring constants of the elastomer spring, large, undamped movements are possible, and unstable resonance vibrations can occur.

Another known bearing in which the fastening parts are connected to one another by means of an elastomer spring is disclosed by European Patent No. 0 042 761. This elastomeric bearing is equipped with one damping apparatus which acts in the horizontal direction and one which acts in the vertical direction. A disadvantage of this configuration is that the simple embodiment is only somewhat effective.

OBJECT OF THE INVENTION

The object of the present invention is to improve an elastomeric bearing so that the transmission of vibrations in the vertical and in at least one horizontal direction can be effectively damped, whereby the horizontal damping may be required either in the longitudinal direction of the vehicle, e.g. chassis bearings, and/or in the transverse direction of the vehicle, e.g. engine bearings.

SUMMARY OF THE INVENTION

This object can be achieved according to the present invention wherein at least a first, and possibly horizontally disposed, damping apparatus preferably consists of at least two chambers disposed substantially opposite to one within the bearing. The chambers are preferably molded into the elastomer spring and can be open towards the bottom. At least one passage can be present to connect the chambers. The bottom of the chambers can preferably be bordered, or formed, by a separating part.

Underneath the separating part there can be a second damping apparatus oriented in another direction different from the orientation of the first damping apparatus. The orientation of the second damping apparatus could possibly be disposed vertically, or along a Cz coordinate axis. The chambers of this second damping apparatus can preferably be located one behind the other in the direction of the Cz coordinate axis. Further, the chambers can be connected to one another by means of an additional connecting passage.

An advantage of the configuration of the present invention is that when two chambers are used in a chassis bearing, the bearing can provide high lateral forces in the Cy direction, as well as the absorption of large vertical forces and damping of vertical vibrations. Thus a high roll comfort can simultaneously be achieved in the longitudinal direction of the vehicle by a soft Cx spring characteristic and by damping. On the other hand, when the bearing is used as an engine bearing, also with two chambers, high loads can be absorbed and vibrations can be damped in the Cz direction, while large braking forces can be absorbed in the Cx direction, and with a soft spring characteristic, the transverse shaking of the motor can be effectively damped in the Cy direction.

In one essential configuration of the invention, the elastomeric bearing can have a soft thrust characteristic in one horizontal coordinate axis, and can have a hard thrust characteristic in the other horizontal coordinate axis, and the horizontal damping apparatus can preferably be oriented in the direction of the soft thrust characteristic.

When more than two chambers are used in connection with at least one damping passage, damping in several transverse directions can be achieved as desired.

In additional possible configurations of the invention, the elastomeric bearing can be designed either as a round, or cylindrical bearing or as a rectangular bearing.

Another essential characteristic of the invention is that the chambers in the elastomer spring can essentially be located substantially diametrically opposite to one another on both sides of one of the fastening parts in the direction of damping. The walls of a connecting passage, connecting the two chambers, can thereby advantageously be formed by at least one of the fastening parts and by a separating part. Moreover, each of the two chambers can be connected to one another by means of this passage.

One configuration, which is simple from a manufacturing point of view, specifies that the separating part preferably separates the chambers of one damping apparatus from the chambers of another damping apparatus. An advantage of this configuration is that the damping apparatus for providing vertical damping can be located in the vicinity of the bearing axis underneath the elastomer spring and the separating part.

In a favorable embodiment, the separating part can be equipped with an axial stop for limiting vertical deflections of the bearing.

In an additional configuration of the invention, at least one of the chambers of at least one of the damping apparatuses can be designed as a volume-compensating equalization chamber. In this case, there can advantageously be a protective cap covering the equalization chamber, which protective cap can have, if necessary, an evacuation hole for pressure equalization in relation to the equalization chamber disposed therein.

Instead of linear holes between the individual chambers, an additional essential feature of the invention is that at least one of the passages can be designed as a ring-shaped damping passage disposed about the bearing axis. The passage can thereby advantageously be located in a partition separating the chambers. This partition can also be provided with a decoupling membrane to further reduce resonance vibrations of the bearing.

In an additional configuration, the connecting passage can be designed as a hole in the fastening part.

In accordance with an additional essential feature, at least one chamber can have a decoupling membrane, and/or at least one bypass valve located parallel to the damping passage.

In one additional favorable embodiment, there can be an opening in the separating part for pressure equalization between the chambers of a first damping device and the chambers of at least one additional damping device.

One aspect of the invention resides broadly in a hydraulically damping elastomeric bearing for damping transmission of vibrations between a first object and a second object. The bearing comprises a first attachment device for attaching said bearing to the first object, a second attachment device for attaching the bearing to the second object, and an apparatus for connecting the first attachment device to the second attachment device. The means for connecting comprises a cavity therein. The bearing comprises, within the cavity, a first hydraulic damping device for damping transmission of vibrations in a first direction, and a second hydraulic damping device for damping transmission of vibrations in a second direction. The first hydraulic damping device is configured to be substantially independent from the second hydraulic damping device, the second hydraulic damping device is configured to be substantially independent from the first hydraulic damping device, and the first direction is disposed at a substantial angle from the second direction.

BRIEF DESCRIPTION OF THE DRAWINGS

Preferred embodiments of the invention are schematically illustrated in the accompanying drawings, in which:

FIG. 3 shows a side view, in partial cross section, of the elastomeric bearing illustrated in FIG. 1;

FIGS. 4 and 4a shows an elastomeric bearing which is in principle like the one illustrated in FIG. 1, but which is designed as a round bearing;

DESCRIPTION OF THE PREFERRED EMBODIMENTS

Figure 1:
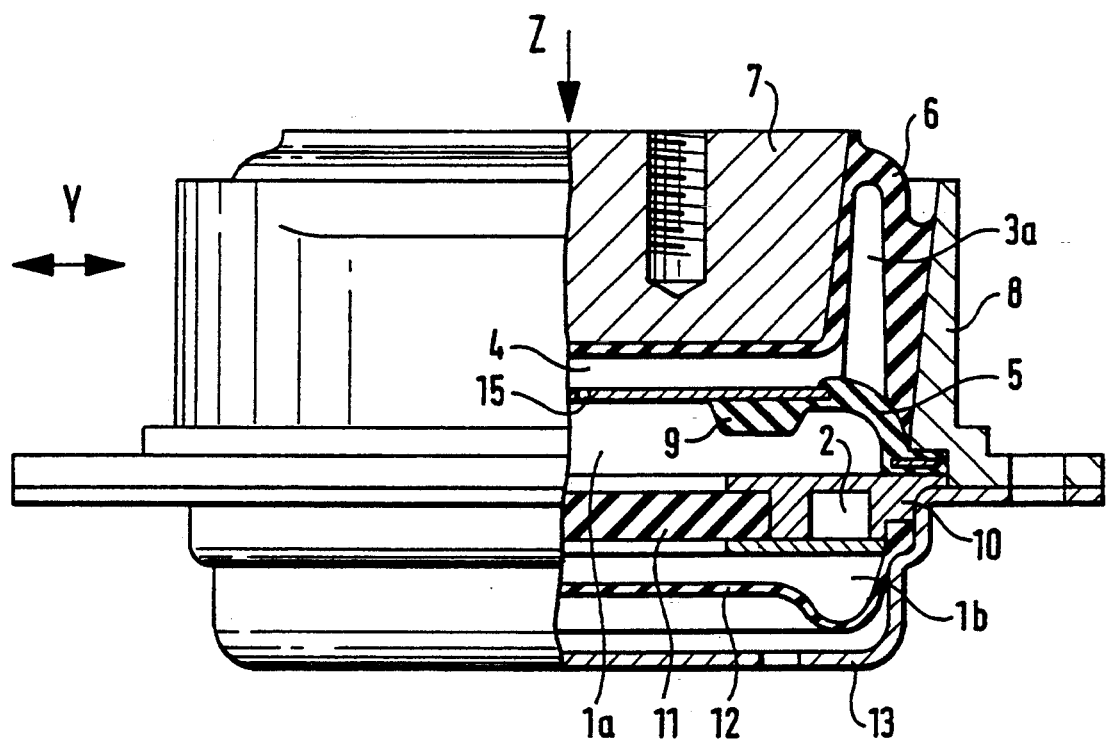
FIG. 1 shows, in partial cross section, an elastomeric bearing designed as an engine bearing.
Figure 2:
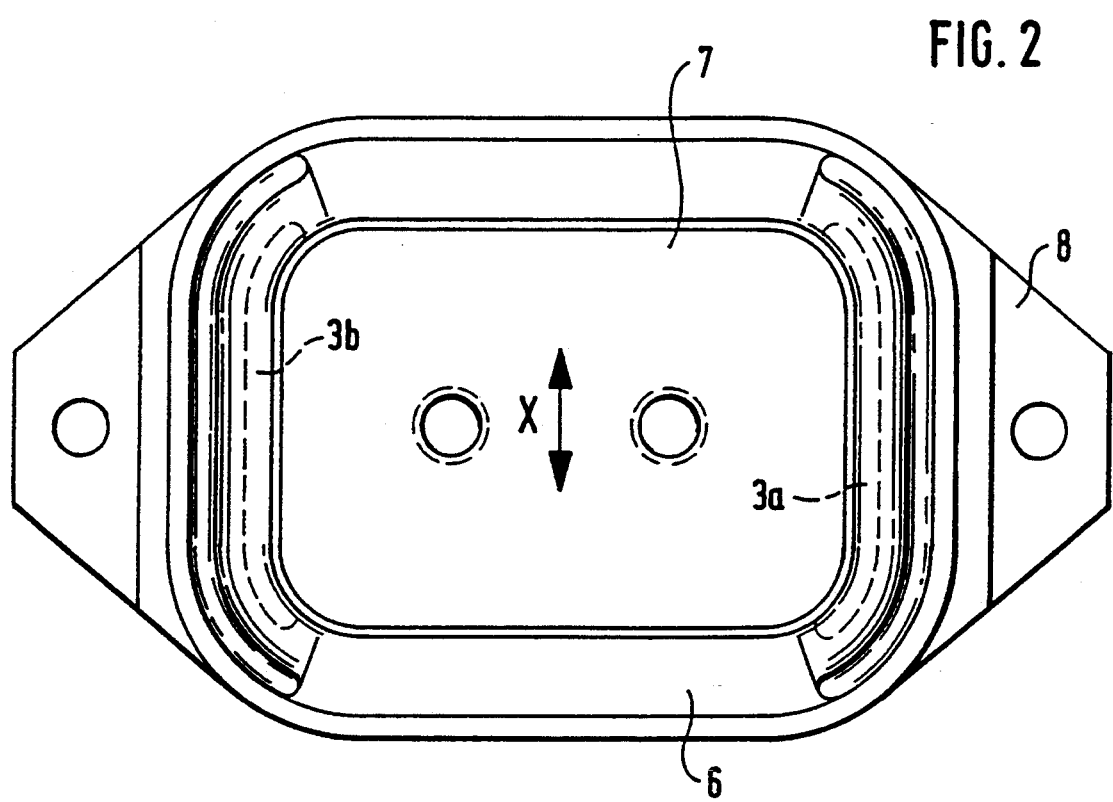
FIG. 2 shows a plan view of the elastomeric bearing illustrated in FIG. 1.

The hydraulic damping elastomeric bearing illustrated in FIG. 1 can preferably have at least two fastening parts 7 and 8 for fastening the bearing between two objects, such as an engine and a chassis of a motor vehicle. The two fastening parts 7 and 8 can preferably be connected to one another by means of an elastomer spring 6. Inside the elastomeric bearing there can preferably be at least two damping devices which work essentially independently of one another. Further, in one direction., which can be the direction of a Cx axis, as seen in FIG. 2, the elastomeric bearing can have a relatively stiff thrust characteristic. In FIG. 1, this Cx axis runs perpendicular to the plane of the drawing.

The elastomer spring 6 can preferably be equipped with at least two chambers, 3a and 3b, which can preferably be in hydraulic communication with one another by means of a passage 4. The passage 4 can at least partially be located in the fastening part 7, while a portion of the passage 4 can also be formed by the separating part 5. The damping apparatus formed by chambers 3a, 3b, and passage 4 essentially provides a hydraulic damping along the Cy axis.

The fastening part 8 can preferably have a cavity therein forming chambers 1a and 1b. The fastening part 8 can be equipped with a partition 10 separating the chambers 1a and 1b, and a bellows 12 defining at least a part of the chamber 1b. The chambers 1a and 1b can be hydraulically connected to one another by means of a passage 2 within the partition 10. The damping apparatus formed by chambers 1a, 1b, and passage 2 essentially provides a hydraulic damping along the Cz axis, which axis can be arranged vertically during use. To prevent an excessive vertical spring deflection of the fastening part 7, the separating part 5 can be equipped with a stop 9, which works together with the partition 10 to limit the deflection of fastening part 7 towards the fastening part 8.

The partition 10 can also be equipped with a decoupling membrane 11 to further reduce resonance vibrations of the bearing.

The chamber 1b and the bellows 12 can be protected against the atmosphere by means of a protective cap 13.

In the separating part 5, there can be a small-diameter opening 15 for allowing a pressure equalization between the chamber of one damping apparatus, for example, chambers 3a and 3b, and the chambers of another damping apparatus, for example chamber 1a and 1b.

The plan view in FIG. 2 shows that the fastening parts 7 and 8 can be configured approximately rectangularly. As such, the thrust spring 6 can run essentially along the longitudinal sides of the elastomeric bearing. Further, in the vicinity of the end sides, the thrust spring 6 can preferably be equipped with the chambers 3a and 3b that form a corresponding hydraulic damping apparatus for damping movements in the longitudinal direction.

The side view in FIG. 3 shows that the separating part 5 can preferably separate the passage 4 in the fastening part 7 from the chamber 1a therebelow. The chamber 1b, in this embodiment, serves as a volume-compensating equalization chamber. To achieve a proper pressure equalization, there can be an evacuation hole 14 in the protective cap 13 to thereby allow atmospheric pressure to act on the external side of chamber 1b.

A further more detailed discussion of the embodiment as depicted in FIGS. 1-3 is provided below with reference to FIGS. 8-10.

Figure 4A:
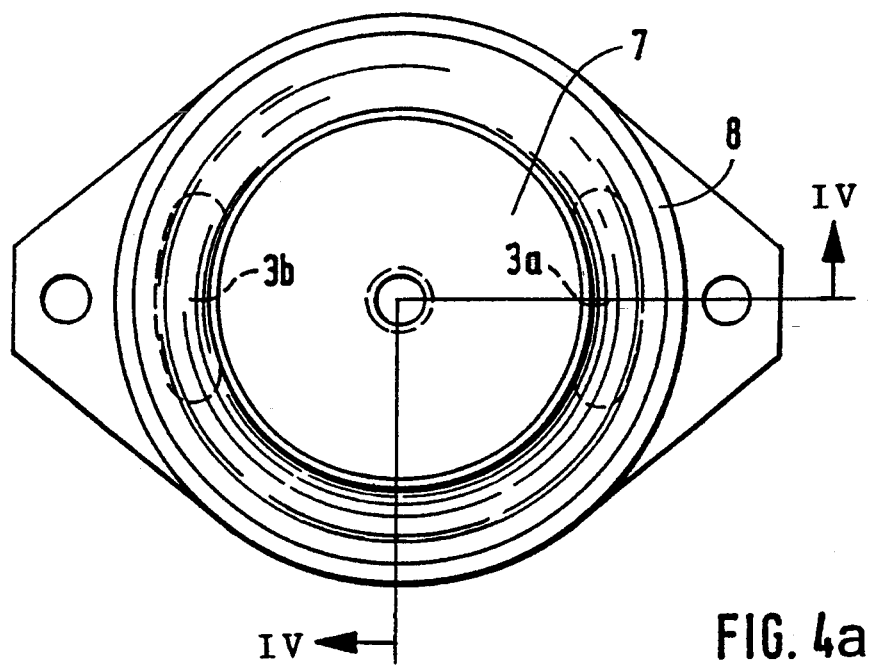

FIGS. 4 and 4a show an alternative embodiment wherein the bearing is configured in the form of a cylindrical, or round bearing. FIG. 4a shows a plan view of the round bearing with two chambers 3a and 3b disposed opposite to one another. FIG. 4 shows a cross-sectional view taken along line IV—IV of FIG. 4a, or through approximately a 90° slice of the elastomeric bearing. FIGS. 4 and 4a show, in particular, the fastening parts 7 and 8, whereby the chamber 3a can be in communication, via the passage 4, with the chamber 3b (not shown, since the left side is shown offset by 90 degrees). The chambers 1a and 1b can be in hydraulic communication with one another via the passage 2. The elastomer spring 6 preferably runs conically around the fastening part 7 and can be configured to contain the chambers 3a and 3b therein.

Figure 5:
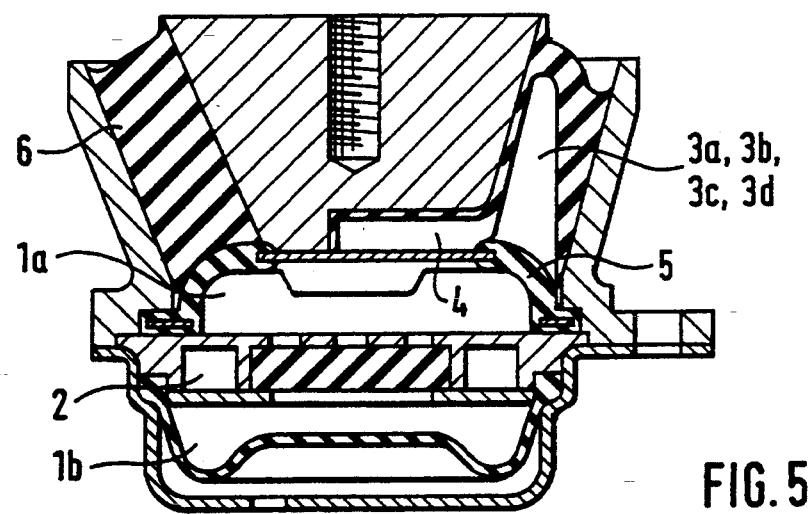
FIGS. 5 to 7 show additional embodiments of an elastomeric bearing with four chambers.
Figure 6:
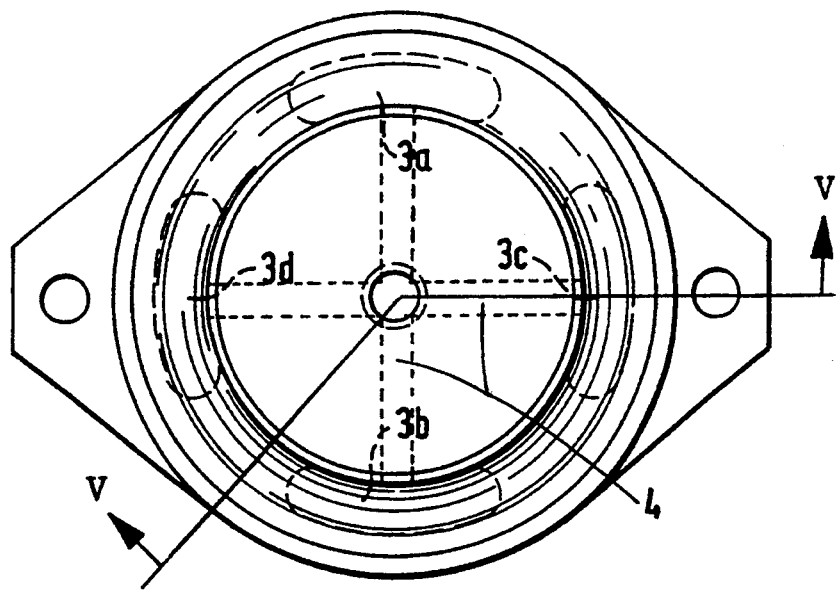
Figure 7:
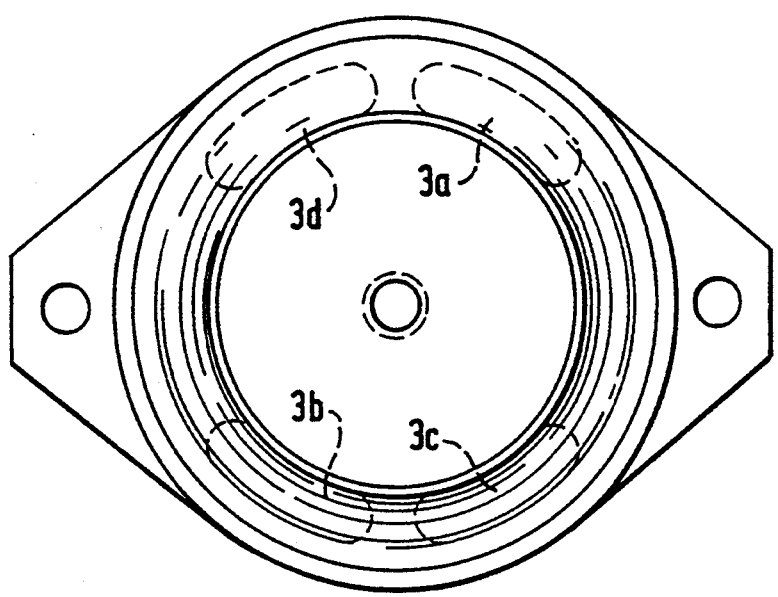

FIG. 5 and the corresponding plan views in FIGS. 6 and 7 show an elastomeric bearing in which there are chambers 3a, 3b, 3c, and 3d in the elastomer spring 6 in two horizontal axes. FIG. 5 essentially depicts a cross-section of the bearing taken for example along the line V—V of FIG. 6, and could also represent a similar cross-section of the bearing shown in FIG. 7. A damping in one or more transverse directions can be achieved by means of a connection of two chambers or of all the chambers by means of a passage 4. The chambers 3a, 3b, 3c, 3d can thereby be arranged as illustrated in FIG. 6, wherein all four chambers are shown interconnected by a passage 4 depicted in outline format. Alternatively, it could also be possible to independently isolate the flow connection between chambers 3c and 3d from the flow connection of chambers 3a and 3b to thereby isolate the two damping directions from one another. Still another alternative embodiment could have a connection passage 4 connecting only one pair of opposite chambers, i.e. chambers 3a and 3b, as discussed above, while yet another damping effect could be achieved if chambers 3c and 3b were interconnected by a passage (not shown) and chambers 3a and 3d were interconnected by a second passage (not shown).

Various other types of arrangements of chambers 3a-3d, as well as various other connection schemes between the chambers 3a-3d, and various sizes and shapes of connection passages 4 could also be configured to provide a variety of alternative damping characteristics for such a bearing as provided by the present invention. For example, although not shown in the drawings, the connecting passage between chambers 3a and 3b could have a greater width and/or height dimension than the connecting passage between the chambers 3c and 3d to provide a greater damping effect in the 3a-3b direction than in the 3c-3d direction.

Further, as illustrated in FIG. 7, the chambers 3b and 3c could be offset towards one side of the bearing, while the other two chambers 3a and 3d could be offset towards the opposite side of the bearing, so that if necessary, a hard thrust-compression characteristic within a defined range can still be provided in one horizontal direction.

A more detailed description of the elastomeric bearing according to the present invention will now be given with reference to FIGS. 8-10, which show the rectangular embodiment of the bearing. As discussed previously, the bearing can have two fastening parts 7 and 8 for fastening the bearing between two objects. In the embodiment shown, the fastening part 7 is essentially a rectangular block having slightly tapered peripheral walls 24. These peripheral walls 24 can be disposed at an angle "alpha" of approximately 82° with respect to the top surface 26. This angle "alpha" could however vary depending on the space allotment and the size of the chambers 3a and 3b, etc. In the fastening part 7 there can be threaded bores 20 for receiving a threaded bolt (not shown) therein. Thus, for example, an engine block (not shown) could be fastened to the the fastening part 7 by means of threaded bolts. The fastening block 7 could also be configured with alternative modes of fastening which are within the skill of the artisan.

The fastening part 8 could essentially comprise an exterior rectangular side wall for being disposed about the fastening part 7. This fastening part 8 can have a flange portion 16 extending approximately perpendicularly outwardly from the fastening part 8. The fastening part 8 can then be fastened to an object, such as, for example, a chassis of a motor vehicle (not shown), by means of the holes 17 passing through the flange 16. A bolt (not shown) could be disposed through the holes 17 to bolt the bearing to the chassis. Alternatively, the fastening part 8, could also be configured with other modes of fastening as are within the skill of the artisan, and the flange 16 could be disposed at various other angles with respect to the bearing depending upon the configuration of the object to which the bearing is to be fastened.

As shown, there can preferably be an elastomeric body, or spring 6 joining the two fastening parts 7 and 8. The two fastening parts 7 and 8 can be intimately bonded to the elastomer to maintain a desired configuration of the bearing. In essence, the fastening part 7 can be, with the exception of the surface 26, completely surrounded by the elastomer of the elastomeric spring 6. Likewise, substantially the entire inner side 27 of the fastening part 8 can also be in contact with the elastomer of the elastomeric spring 6. Towards the top surface 26 of the bearing, and between the fastening parts 7 and 8 there can be a circumferential groove 21 disposed in the elastomeric spring 6. This groove can essentially serve as a space for expansion of the elastomer of the elastomeric spring 6 thereinto.

Within the elastomeric spring 6, can be formed the two fluid chambers 3a and 3b, preferably at opposite ends of the rectangular bearing. To simplify construction, these chambers 3a and 3b can be left open on their bottom ends, or the ends disposed away from the top surface 26. There can also be a passage 4 connecting the two chambers 3a and 3b in the vicinity of the bottom of the chambers. This passage 4 can preferably be formed into either the base of the fastening part 7, or if the base of the fastening part 7 is covered with the elastomer of the elastomeric spring 6, the passage 4 could also be formed in the elastomer of the elastomeric spring 6. The passage 4 can also be left open along the bottom thereof.

The chambers 3a and 3b can preferably be filled with a damping fluid, to thereby provide a damping of vibrations or movements along the direction "Y". In essence, the chambers 3a, 3b, and the passage 4 form a first damping apparatus within the bearing.

Figure 8:
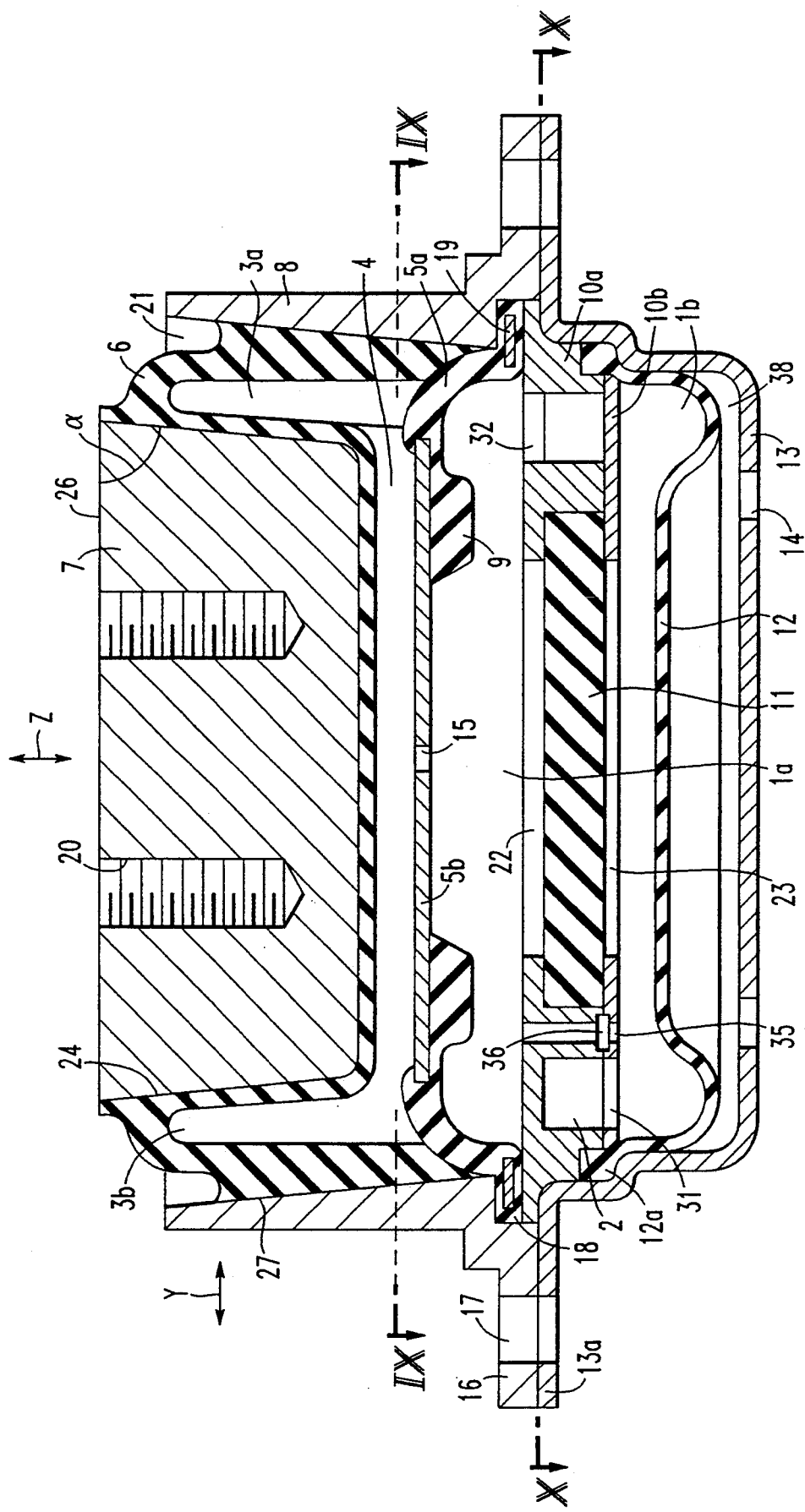
FIG. 8 shows a full cross-sectional view of the rectangular bearing of FIGS. 1 and 2.
Figure 9A:
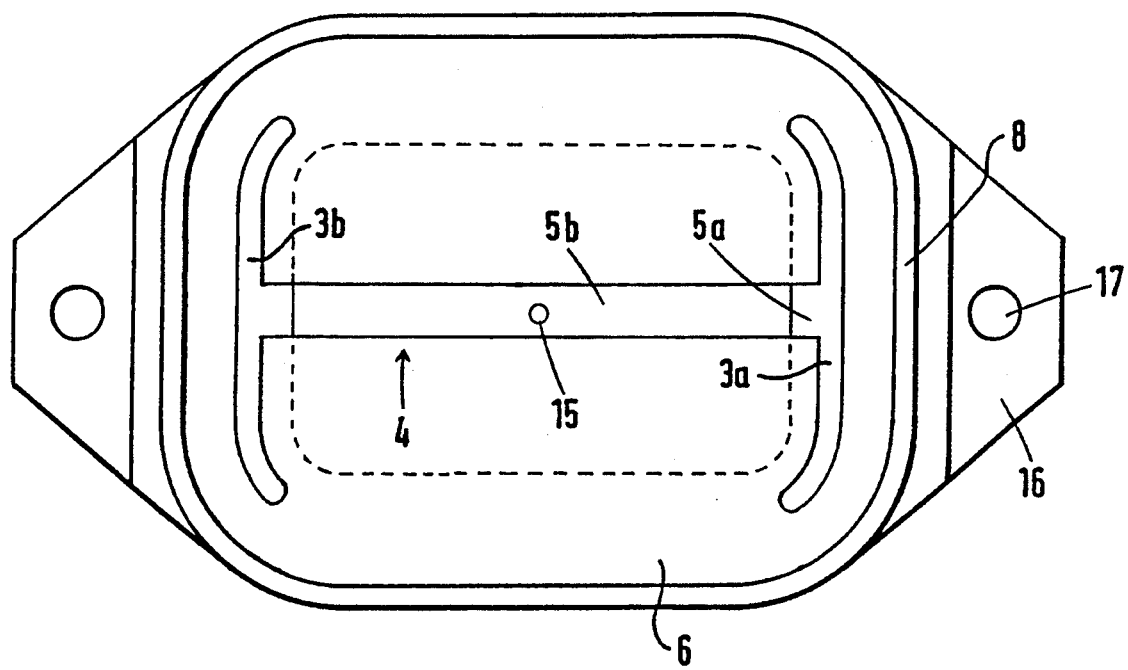
FIGS. 9a and 9b show alternative embodiments of the bearing as viewed along the line IX—IX in FIG. 8.
Figure 9B:
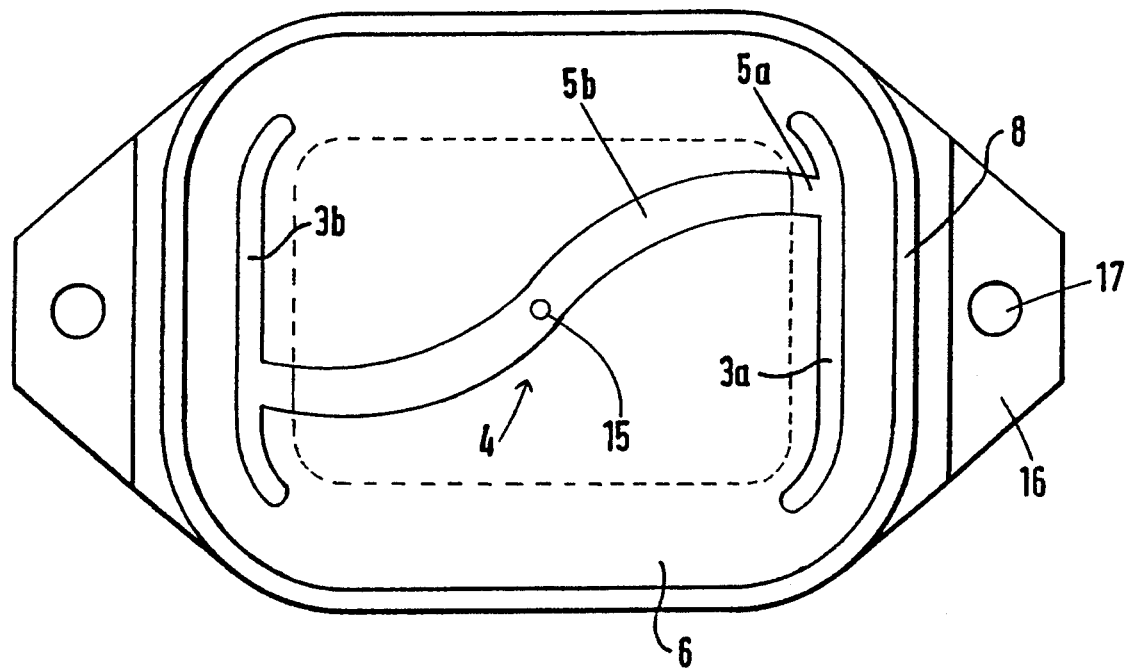

FIGS. 9a and 9b show alternative embodiments of the passage 4, in a cross sectional view taken along the line IX—IX of the bearing depicted in FIG. 8. In possibly the simplest form, the passage 4 could run directly between the chambers 3a and 3b as shown in FIG. 9a.

Alternatively, the passage 4 could essentially follow any type of shaped path between the chambers 3a and 3b, within the confines of the bearing. One possibility is shown in FIG. 9b, wherein the passage 4 could be "S-shaped". As discussed previously, the configuration of the passage 4 could be varied as needed, and there could also be more than one passage 4, to provide the desired damping characteristics for the bearing.

To partition the chambers 3a, 3b and the passage 4 from the rest of the bearing, there can be a separating part which is formed by the members 5a and 5b. The member 5a can preferably be formed of a resilient material, such as elastomer, and can essentially have a dome-shaped configuration, with a cut-away central portion into which can be disposed the member 5b. This member 5b can be made of a rigid material, such as a metal plate, or a rigid plastic, and can be embedded about its circumference in the material of the member 5a. Although the shape of the member 5b is not shown, it is conceivable that essentially unlimited shapes, such as rectangular, circular, oval, as well as non-symmetrical shapes, could be used if the cut-away center of the member 5a essentially had a similar configuration to hold the member 5b.

In order to fasten this separating part within the bearing, the outer circumference of the member 5a can have a flange portion 18 which can be clamped into position, within a corresponding recess, or step, of the fastening part 8. This flange 18 can also have embedded therein, a reinforcement 19 for maintaining the peripheral shape of the member 5a.

The separating part formed by members 5a and 5b preferably separates the upper, or first damping apparatus formed by chambers 3a, 3b and passage 4, from a second damping apparatus disposed therebelow. This second damping apparatus, as shown in FIG. 8 can provide a damping in a direction indicated by "Z", which direction can be approximately perpendicular to the direction of damping of the first damping apparatus. This second damping apparatus can essentially be formed by chambers 1a and 1b which can be separated from one another by a partition which is formed by parts 10a, 10b and 11. The partition can essentially be disposed adjacent the separating part, so that the chamber 1a can be formed by the dome-shaped area of the separating part, or substantially between the member 5a and a first side, or top side, of the partition. Adjacent a second side, or a bottom side of the partition, there can be an expandable bellows 12 which defines the chamber 1b. This bellows 12 can have, about its peripheral edge, a bead 12a. This bead 12a can provide a means for clamping the bellows in place within the bearing assembly.

To enable fluid flow between the chambers 1a and 1b, there can be a throttle passage 2 disposed in the partition. The actual configuration of the partition and the throttle passage could vary depending on the desired end result, and several alternate embodiments would be well within the skill of the artisan. One of the many types of configurations is depicted by FIG. 10, wherein the partition would essentially have a rectangular shape. Between the parts 10a and 10b, the throttle passage 2 could be disposed. The throttle passage 2 can be open to the chambers 1a and 1b via the depicted openings 31 and 32, which in this instance would be disposed at about 180° from one another about the periphery of the partition. A further depiction of the passage 2 is shown in FIG. 10, discussed in more detail herebelow.

Alternatively, the throttle passage could be shorter or longer depending on the placement of the openings 31 and 32, and the fluid path could essentially range from approximately 0° to 360° around the periphery, with 0° essentially representing a straight through path of travel, and 360° representing a path about one full circumference of the partition. Alternatively, it is known that throttle passages can even extend well beyond a 360° path of travel by partitioning the throttle passage for providing, for example, two full turns about the circumference of the partition, or about 720°.

If desired, the partition can also have a decoupling membrane 11 mounted between the chambers 1a and 1b. The decoupling membrane can essentially also be disposed between the parts 10a and 10b, and can be exposed to chambers 1a and 1b via central opening 22 in the part 10a and central opening 23 in the part 10b. As discussed above, for the member 5b of the separating part, the decoupling membrane 11 could also be configured in a variety of shapes, and is not limited to the depicted drawings.

Figure 10:
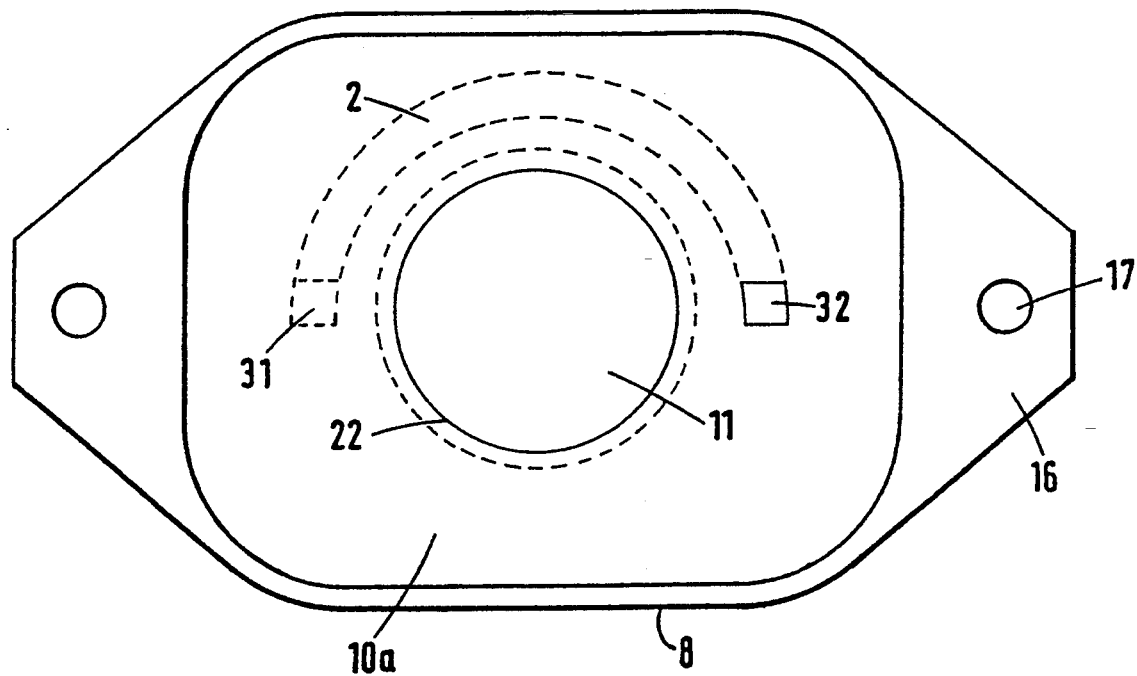
FIG. 10 shows one possible cross-sectional view taken along the line X—X of the bearing shown in FIG. 8.

One possible configuration of the decoupling membrane 11 and the throttle passage 2 is shown in FIG. 10. In this configuration, the decoupling membrane is disc-shaped, but as discussed above, this decoupling membrane could also be rectangular, oval, etc. Further, in this embodiment, the throttle passage 2 (shown in outline) is arc-shaped, and disposed about the decoupling membrane 11, passing from opening 32 to opening 31 (shown in outline).

To limit the downward deflection of the fastening part 7 into the fastening part 8, the bottom side of the separating part can have stops 9 affixed thereto. The stops 9 can come into contact with the upper surface of the partition to provide a limit to the deflection. The size of the stops 9, and the height of the chamber 1a can essentially determine the range of movement available for any downward deflection. In essence, these stops 9 can be a continuance of the material which forms the parts 5a, and can therefore be molded therewith.

In another alternative embodiment, the partition between chambers 1a and 1b can be provided with a bypass passage 35 for bypassing damping fluid between chambers 1a and 1b. This bypass passage can be equipped with a bypass valve 36, which, in a simple embodiment could comprise a flap of elastomeric material which is displaceable by a certain fluid pressure applied thereto to thus open the passage. It is also conceivable that this bypass passage 35 could pass through the decoupling membrane 11.

To protect the bellows 12 and provide a means for clamping the entire bearing assembly together, the bottom of the bearing could have a protective cap 13 thereover. The protective cap could be configured with a flange 13a that essentially corresponds to the flange 16 of the fastening part 8. The two flanges 13a and 16 could then be rigidly affixed to one another to maintain the bearing assembly together, while clamping the separating part, the divider, and the bellows 12 in place therewithin. To provide pressure equalization adjacent the expandable bellows, the cap 13 can have at least one orifice 14 therein to allow for air passage into and out of the area 38 adjacent the bellows 12.

One additional embodiment of the invention provides for at least one fluid bypass opening 15 within the member 5b of the separating part. This opening 15 can then provide pressure equalization between the first damping apparatus, formed by chambers 3a, 3b and passage 4, and the second damping apparatus, formed by the chambers 1a, 1b and the passage 2.

One feature of the invention resides broadly in an elastomeric bearing, in particular for motor vehicles, with at least two fastening parts which are connected to one another by means of an elastomer spring, and with a vertically acting hydraulic damping apparatus and at least one hydraulic damping apparatus acting in the horizontal direction, consisting of chambers filled with damping fluid and connected to one another by means of damping passages, characterized by the fact that the horizontally acting damping apparatus consists of at least two chambers 3a, 3b opposite one another molded into the elastomer spring and open on the bottom, and at least one passage connecting the chambers, whereby the chambers 3a, 3b are bordered on the bottom by a separating part 5, that underneath a separating part 5, there is a second damping apparatus oriented in the direction of the vertical coordinate axis Cz, whose chambers 1a and 1b are located one behind the other in the direction of the coordinate axis Cz and are connected to one another by means of the passage 2.

Another feature of the invention resides broadly in the elastomeric bearing, characterized by the fact that the elastomeric bearing has a soft thrust characteristic in one horizontal coordinate axis and a hard characteristic in the other horizontal coordinate axis, and that the horizontal damping apparatus is oriented in the direction of the soft thrust characteristic.

Yet another feature of the invention resides broadly in the elastomeric bearing, characterized by the fact that the elastomeric bearing is designed as a rectangular bearing.

Still another feature of the invention resides broadly in the elastomeric bearing, characterized by the fact that the elastomeric bearing is designed as a round bearing.

Still yet another feature of the invention resides broadly in the elastomeric bearing, characterized by the fact that the chambers 3a, 3b and/or the chambers 3c, 3d in the elastomer spring 6 are located diametrically opposite one another on both sides of one of the fastening parts 7.

Yet another feature of the invention resides broadly in the elastomeric bearing, characterized by the fact that the walls of the passage 4 are formed by one of the fastening parts 7 or 8 and a separating part 5.

Still another feature of the invention resides broadly in the elastomeric bearing, characterized by the fact that the chambers 3a, 3b and the chambers 3c, 3d are each connected to one another by means of a passage 4.

Still yet another feature of the invention resides broadly in the elastomeric bearing, characterized by the fact that the separating part 5 separates the chambers 3a and 3b and the chamber 1a from one another.

Yet still another feature of the invention resides broadly in the elastomeric bearing, characterized by the fact that the separating part 5 is equipped with an axial stop 9.

Still another feature of the invention resides broadly in the elastomeric bearing, characterized by the fact that the chamber 1b is designed as a volume-compensating equalization chamber.

Another feature of the invention resides broadly in the elastomeric bearing, characterized by the fact that at least one of the passages 2 or 4 is designed as a damping passage which runs in ring-like fashion around the bearing axis.

Yet another feature of the invention resides broadly in the elastomeric bearing, characterized by the fact that the passage 2 is located on a partition 10 separating the chambers 1a and 1b.

Still another feature of the invention resides broadly in the elastomeric bearing, characterized by the fact that the partition 10 is equipped with a decoupling, or anti-resonance membrane 11.

Still yet another feature of the invention resides broadly in the elastomeric bearing, characterized by the fact that the passage 4 is designed as a hole in the fastening part 7.

Another feature of the invention resides broadly in the elastomeric bearing, characterized by the fact that at least one of the chambers 1a, 1b, 3a, 3b, 3c, 3d is equipped with a decoupling membrane 11.

Yet another feature of the invention resides broadly in the elastomeric bearing, characterized by the fact that parallel to the passages 2 and 4, there is at least one bypass valve located between the chambers 1a, 1b or 3a, 3b, 3c, 3d.

Still another feature of the invention resides broadly in the elastomeric bearing, characterized by the fact that in the separating part 5, there is an opening 15 for pressure equalization between the chambers 3a, 3b and the chambers 1a, 1b.

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically damped elastomeric bearing for damping transmission of vibrations between a first object and a second object, said bearing comprising:
   first attachment means for attaching said bearing to the first object;
   second attachment means for attaching said bearing to the second object;
   means for connecting said first attachment means to said second attachment means;
   said means for connecting comprising cavity means therein;
   said bearing comprising within said cavity means:
      first hydraulic damping means for damping transmission of vibrations in a first direction; and
      second hydraulic damping means for damping transmission of vibrations in a second direction;
      said first hydraulic damping means being configured to be substantially independent from said second hydraulic damping means;
      said second hydraulic damping means being configured to be substantially independent from said first hydraulic damping means; and
      said first direction being disposed at a substantial angle from said second direction;
   said first hydraulic damping means comprises:
      a first fluid chamber;
      a second fluid chamber separate from said first fluid chamber;
      damping fluid disposed within each of said first fluid chamber and said second fluid chamber; and a first connecting passage fluidly connecting said first fluid chamber to said second fluid chamber for flow of damping fluid between said first fluid chamber and said second fluid chamber;

said first fluid chamber and said second fluid chamber of said first hydraulic damping means being substantially aligned in said first direction;

said second hydraulic damping means comprises:
a third fluid chamber;
a fourth fluid chamber separate from said third fluid chamber;
damping fluid disposed within each of said third fluid chamber and said fourth fluid chamber; and
a second connecting passage fluidly connecting said third fluid chamber to said fourth fluid chamber for flow of damping fluid between said third fluid chamber and said fourth fluid chamber;

said third fluid chamber and said fourth fluid chamber of said second hydraulic damping means being substantially aligned in said second direction;

said bearing further comprises means for separating said first and second fluid chambers of said first hydraulic damping means from said third and fourth fluid chambers of said second hydraulic damping means;

said first direction and said second direction are disposed substantially perpendicularly to one another;

said bearing defines a bearing axis disposed along said second direction;

said first hydraulic damping means and said second damping means being substantially aligned along said bearing axis;

said means for connecting said first attachment means to said second attachment means comprises an elastomeric member disposed between at least a portion of said first attachment means and at least a portion of said second attachment means;

said elastomeric member comprises said first fluid chamber and said second fluid chamber of said first hydraulic damping means therein;

at least a portion of said second attachment means is disposed radially around said bearing axis forming an interior space within said second attachment means, said second attachment means comprising an interior surface disposed towards said interior space;

at least a portion of said first attachment means is disposed concentrically within said interior space of said second attachment means, said at least a portion of said first attachment means defining an exterior surface disposed towards said second attachment means;

said elastomeric member is disposed concentrically between said interior surface of said second attachment means and said exterior surface of said at least a portion of said first attachment means within said interior space of said second attachment means;

said at least a portion of said first attachment means disposed within said interior space has a first side portion and a second side portion disposed diametrically opposite one another in said first direction;

one of said first fluid chamber and said second fluid chamber of said first hydraulic damping means being disposed adjacent one each of said first side portion and said second side portion of said at least a portion of said first attachment means between said exterior surface of said at least a portion of said first attachment means and said interior surface of said second attachment means;

said at least a portion of said first attachment means disposed within said interior space further comprises a base portion extending from said first side portion to said second side portion;

said base portion comprises channel means therein extending from said first fluid chamber to said second fluid chamber of said first hydraulic damping means, said channel means forming at least a portion of said first connecting passage connecting said first fluid chamber to said second fluid chamber of said first hydraulic damping means;

said first fluid chamber, said second fluid chamber and said first connecting passage are open in the vicinity of the base portion of said at least a portion of said first attachment means within said interior space;

said means for separating comprises a first surface disposed towards said first hydraulic damping means, and a second surface disposed towards said second hydraulic damping means;

said base portion of said at least a portion of said first attachment means within said interior space is disposed in contact with said first surface of said means for separating;

said first surface of said means for separating defines at least a portion of each of said first fluid chamber, said second fluid chamber and said first connecting passage;

said third fluid chamber of said second hydraulic damping means is disposed adjacent said second surface of said means for separating;

said second connecting passage connecting said third fluid chamber to said fourth fluid chamber is disposed circumferentially about said bearing axis around at least a portion of said bearing;

said bearing further comprises partition means for separating said third fluid chamber and said fourth fluid chamber of said second hydraulic damping means;

said partition means comprises said second connecting passage connecting said third fluid chamber to said fourth fluid chamber;

at least one of: the first fluid chamber, the second fluid chamber, the third fluid chamber and the fourth fluid chamber additionally comprises a decoupling membrane;

said partition means further comprises said decoupling membrane, said decoupling membrane being disposed between said third fluid chamber and said fourth fluid chamber;

said fourth fluid chamber comprises a volume-compensating equalization chamber;

said first attachment means is movable axially within said second attachment means in a direction along said bearing axis vertically, and said first direction disposed parallel to a longitudinal direction of the motor vehicle; and an engine bearing configured for being mounted in the motor vehicle to have said second direction disposed vertically, and said first direction disposed transverse to the longitudinal direction of the motor vehicle;

said pressure activated valve in said at least one bypass passage comprises an elastomeric flap;

said first fluid chamber and said second fluid chamber are molded into said elastomeric member;

said bearing has a periphery about said bearing axis and defined by said second attachment means, and said periphery of said bearing is one of:
round; and
rectangular;

said bearing further comprises an expandable bellows disposed adjacent to, and spaced apart from said second surface of said partition means, said expandable bellows being expandable in a direction away from said partition means;

said second attachment means has a first end adjacent said first attachment means, and a second end opposite to said first attachment means;

said second end of second attachment means further comprises a protective cap spaced apart from said expandable bellows for protecting said expandable bellows and limiting expansion of said expandable bellows in said direction away from said partition means, said protective cap defining an air chamber between said protective cap and said expandable bellows;

said protective cap further comprises an opening therethrough for passage of air into and out of said air chamber for pressure equalization;

said second attachment means comprises a first peripheral wall portion defining said interior space and said protective cap, said protective cap extending away from said first peripheral wall portion;

said means for separating and said partition means each comprising a peripheral edge;

said peripheral edge of said means for separating comprising a rigid reinforcement for retaining a peripheral shape of said means for separating;

said second attachment means defining groove means between said peripheral wall portion and said protective cap adjacent said interior surface of said second attachment means;

said groove means for receiving said peripheral edge of each of said means for separating and said partition means therein;

said peripheral wall portion and said protective cap being configured to clamp said peripheral edge of each of said means for separating and said partition means therebetween in said groove means to fixedly retain said means for separating and said partition means within said bearing;

said protective cap further comprises a stepped portion, stepped inwardly towards said bearing axis adjacent said groove means;

said expandable bellows comprises a peripheral edge, and said stepped portion of said protective cap being configured to clamp said peripheral edge of said bellows between said peripheral cap and said partition means;

said partition means has a central portion disposed about said bearing axis, said central portion of said portion means having an opening therein, and said partition means comprising said decoupling membrane extending across said central opening;

said second connecting passage extends circumferentially about said decoupling membrane;

said first surface of said partition means comprises an opening connecting said third fluid chamber with said second connecting passage, and said second surface of said partition means comprises an opening connecting said fourth fluid chamber with said second connecting passage;

said means for separating additionally comprises a central portion and a peripheral portion disposed about said central portion, said peripheral portion comprising said peripheral edge and said stop means;

said central portion of said means for separating comprising a plate member;

said peripheral portion of said means for separating comprising an elastomer;

said plate member comprises a peripheral edge, and said peripheral edge of said plate member is embedded in said elastomer of said peripheral portion of said means for separating;

said peripheral portion of said means for separating being arcuate and extending from said peripheral edge away from said partition means to form said third fluid chamber between said means for separating and said partition means;

said plate member comprises said opening therethrough for passage of damping fluid between said first hydraulic damping means and said second hydraulic damping means;

said first connecting passage is configured as one of:
a straight passage extending between said fluid chambers of said first hydraulic damping means; and
a curvilinear passage extending between said fluid chambers of said first hydraulic damping means;

said second attachment means comprises flange means extending away from said bearing axis, said flange means having bores therethrough for receiving fastening means therethrough to fasten said second attachment means to one of said first object and said second object;

said first attachment means comprises block means for being disposed within said interior space of said second attachment means; towards said partition means separating said third chamber from said fourth chamber;

said second surface of said means for separating comprises stop means for limiting movement of said first attachment means towards said partition means;

said damping bearing further comprising at least one fluid bypass passage disposed at at least one of:
between said first fluid chamber and said second fluid chamber in addition to said first connecting passage, and
between said third fluid chamber and said fourth fluid chamber in addition to said second connecting passage;

said at least one bypass passage comprises a pressure activated bypass valve configured to open under a predetermined fluid pressure differential between connected chambers;

said means for separating further includes an opening therethrough for passage of damping fluid between said first hydraulic damping means and said second hydraulic damping means, said opening having a cross-sectional dimension;

said first connecting passage having a cross-sectional dimension; and said second connecting passage having a cross-sectional dimension;

said cross-sectional dimension of said opening being substantially less than said cross-sectional dimension of said first connecting passage and said cross-sectional dimension of said second connecting passage to substantially maintain said substantial independence of said first hydraulic damping means and said second hydraulic damping means.

2. The damping bearing according to claim 1, wherein:
said bearing defines a third direction substantially perpendicular to each of said first direction and said second direction;
said bearing being configured to have a hard-thrust characteristic in said third direction, and a soft-thrust characteristic in said second direction.

3. The damping bearing according to claim 1, wherein:
said bearing defines a third direction substantially perpendicular to said second direction, and disposed angularly with respect to said first direction;
said first hydraulic damping means additionally comprises:
a fifth fluid chamber; and
a sixth fluid chamber separate from said fifth fluid chamber,
said fifth fluid chamber and said sixth fluid chamber being substantially aligned in said third direction.

4. The damping bearing according to claim 3, wherein said first connecting passage is further configured to fluidly interconnect each of said first fluid chamber, said second fluid chamber, said fifth fluid chamber and said sixth fluid chamber to provide soft damping in each of said first direction and said second direction.

5. The damping bearing according to claim 4, wherein:
said bearing comprises one of:
a chassis bearing configured for being mounted in a motor vehicle to have said second direction disposed
said first attachment means comprising an attachment surface disposed away from said base portion of said first attachment means;
said attachment surface comprising at least one threaded bore extending into said block means;
said at least one threaded bore being configured for receiving threaded bolt means therein to fasten said bearing to the other of said first object and said second object;
said first side portion and said second side portion of said first attachment means each comprise a side surface of said attachment means, said side surfaces of said first attachment means being disposed at an angle of about 82° with respect to said attachment surface;
said channel forming at least a portion of said first connecting passage comprises a bore through said first attachment means;
said elastomeric member disposed between said first attachment means and said second attachment means comprises an exterior surface disposed between said first attachment means and said second attachment means, said exterior surface comprising a groove disposed therein adjacent said interior surface of said second attachment means, said groove being configured for allowing expansion of said elastomeric member thereinto.

* * * * *

UNITED STATES PATENT AND TRADEMARK OFFICE
CERTIFICATE OF CORRECTION

PATENT NO. : 5,386,973
DATED : February 7, 1995
INVENTOR(S) : Heinrich BRENNER and Heinrich MEYER It is certified that error appears in the above-indentified patent and that said Letters Patent is hereby corrected as shown below:

In column 12, Claim 1, line 57, after 'axis', delete lines 58-68, beginning with "vertically, and said first..." and ending with "...elastomeric member;".

In column 13, Claim 1, delete lines 1-67 beginning with "said bearing has..." and ending with "...second connecting passage;".

In column 14, Claim 1, delete lines 1-36 beginning with "said means for..." and ending with "...space of said".

In column 14, line 37, Claim 1, delete "second attachment means;".

In addition, in column 16, line 4, Claim 5, after 'posed' insert the following paragraphs:
--     vertically, and said first direction disposed parallel to a longitudinal direction of the motor vehicle; and
        an engine bearing configured for being mounted in the motor vehicle to have said second direction disposed vertically, and said first direction disposed transverse to the longitudinal direction of the motor vehicle;
    said pressure activated valve in said at least one bypass passage comprises an elastomeric flap;
    said first fluid chamber and said second fluid chamber are molded into said elastomeric member;

UNITED STATES PATENT AND TRADEMARK OFFICE
CERTIFICATE OF CORRECTION

PATENT NO. : 5,386,973
DATED : February 7, 1995
INVENTOR(S) : Heinrich BRENNER and Heinrich MEYER It is certified that error appears in the above-indentified patent and that said Letters Patent is hereby corrected as shown below:

said bearing has a periphery about said bearing axis and defined by said second attachment means, and said periphery of said bearing is one of:
    round; and
    rectangular;
said bearing further comprises an expandable bellows disposed adjacent to, and spaced apart from said second surface of said partition means, said expandable bellows being expandable in a direction away from said partition means;
said second attachment means has a first end adjacent said first attachment means, and a second end opposite to said first attachment means;
said second end of second attachment means further comprises a protective cap spaced apart from said expandable bellows for protecting said expandable bellows and limiting expansion of said expandable bellows in said direction away from said partition means, said protective cap defining an air chamber between said protective cap and said expandable bellows;
said protective cap further comprises an opening therethrough for passage of air into and out of said air chamber for pressure equalization;
said second attachment means comprises a first peripheral wall portion defining said interior space and said protective cap, said protective cap extending away from said first peripheral wall portion;
said means for separating and said partition means each comprising a peripheral edge;

UNITED STATES PATENT AND TRADEMARK OFFICE
CERTIFICATE OF CORRECTION

PATENT NO. : 5,386,973
DATED : February 7, 1995
INVENTOR(S) : Heinrich BRENNER and Heinrich MEYER Page 3 of 5

It is certified that error appears in the above-indentified patent and that said Letters Patent is hereby corrected as shown below:

said peripheral edge of said means for separating comprising a rigid reinforcement for retaining a peripheral shape of said means for separating;

said second attachment means defining groove means between said peripheral wall portion and said protective cap adjacent said interior surface of said second attachment means;

said groove means for receiving said peripheral edge of each of said means for separating and said partition means therein;

said peripheral wall portion and said protective cap being configured to clamp said peripheral edge of each of said means for separating and said partition means therebetween in said groove means to fixedly retain said means for separating and said partition means within said bearing;

said protective cap further comprises a stepped portion, stepped inwardly towards said bearing axis adjacent said groove means;

said expandable bellows comprises a peripheral edge, and said stepped portion of said protective cap being configured to clamp said peripheral edge of said bellows between said peripheral cap and said partition means;

said partition means has a central portion disposed about said bearing axis, said central portion of said partion means having an opening therein, and said partition means comprising said decoupling membrane extending across said central opening;

UNITED STATES PATENT AND TRADEMARK OFFICE
CERTIFICATE OF CORRECTION

PATENT NO. : 5,386,973
DATED : February 7, 1995
INVENTOR(S) : Heinrich BRENNER and Heinrich MEYER Page 4 of 5

It is certified that error appears in the above-indentified patent and that said Letters Patent is hereby corrected as shown below:

said second connecting passage extends circumferentially about said decoupling membrane;
    said first surface of said partition means comprises an opening connecting said third fluid chamber with said second connecting passage, and said second surface of said partition means comprises an opening connecting said fourth fluid chamber with said second connecting passage;
    said means for separating additionally comprises a central portion and a peripheral portion disposed about said central portion, said peripheral portion comprising said peripheral edge and said stop means;
    said central portion of said means for separating comprising a plate member;
    said peripheral portion of said means for separating comprising an elastomer;
    said plate member comprises a peripheral edge, and said peripheral edge of said plate member is embedded in said elastomer of said peripheral portion of said means for separating;
    said peripheral portion of said means for separating being arcuate and extending from said peripheral edge away from said partition means to form said third fluid chamber between said means for separating and said partition means;
    said plate member comprises said opening therethrough for passage of damping fluid between said first hydraulic damping means and said second hydraulic damping means;

UNITED STATES PATENT AND TRADEMARK OFFICE
CERTIFICATE OF CORRECTION

PATENT NO. : 5,386,973
DATED : February 7, 1995
INVENTOR(S) : Heinrich BRENNER and Heinrich MEYER It is certified that error appears in the above-indentified patent and that said Letters Patent is hereby corrected as shown below:

of: said first connecting passage is configured as one
    a straight passage extending between said fluid chambers of said first hydraulic damping means; and
    a curvilinear passage extending between said fluid chambers of said first hydraulic damping means;
  said second attachment means comprises flange means extending away from said bearing axis, said flange means having bores therethrough for receiving fastening means therethrough to fasten said second attachment means to one of said first object and said second object;
  said first attachment means comprises block means for being disposed within said interior space of said second attachment means;--.

Signed and Sealed this

Twentieth Day of May, 1997

Attest:

BRUCE LEHMAN

Attesting Officer      Commissioner of Patents and Trademarks